US005519230A

United States Patent [19]

Hubble, III et al.

[11] Patent Number: 5,519,230

[45] Date of Patent: May 21, 1996

[54] BELT EDGE STEERING SENSOR

[75] Inventors: Fred F. Hubble, III, Rochester; Daniel W. Costanza, Webster; Edward T. Hinton; Michael R. Furst, both of Rochester, all of N.Y.

[73] Assignee: Xerox Corporation, Stamford, Conn.

[21] Appl. No.: 296,289

[22] Filed: Aug. 25, 1994

[51] Int. Cl.[6] .......... G01N 21/86

[52] U.S. Cl. .......... 250/559.36; 250/539.02; 356/375; 355/212

[58] Field of Search .......... 250/548, 557, 250/222.2, 559.36, 559.02; 356/400, 373, 375; 355/212; 198/810.03; 33/501.02, 501.04

[56] References Cited

U.S. PATENT DOCUMENTS

| | | | |
|---|---|---|---|
| 3,219,829 | 11/1965 | Reist | 250/222.2 |
| 3,533,692 | 10/1970 | Blanchette et al. | 355/212 |
| 3,620,614 | 11/1971 | Gunto et al. | 355/212 |
| 4,082,465 | 4/1978 | Bickl et al. | 250/559.02 |
| 4,864,124 | 9/1989 | Mirabella, Jr. et al. | 250/229 |
| 4,959,040 | 9/1990 | Gardner et al. | 474/103 |
| 5,347,348 | 9/1994 | Nagata | 198/810.03 |

*Primary Examiner*—Georgia Y. Epps
*Assistant Examiner*—Jacqueline M. Skady
*Attorney, Agent, or Firm*—Ronald F. Chapuran

[57] ABSTRACT

A sensor having a shutter mounted upon a shaft for rotation within a housing in opposition to a light path between an LED and photodetector is described. A potion of the shaft extends outside the housing connected to an elongated arm. A runner secured to the elongated arm, engages a moving photosensitive surface and deviations of the edge position of the photosensitive surface rotate the shutter in relation to the light path between the LED and photodetector for tracking the edge position of the moving photosensitive surface by providing signals representing shutter position.

13 Claims, 4 Drawing Sheets

BELT EDGE STEERING SENSOR

This invention relates generally to an apparatus and method for tracking the position of a moving photoconductive belt, and more particularly concerns a contact sensor to measure belt edge deviation from a reference position.

One of the many challenges to be overcome in the successful introduction of color reprographic machines is the relative registration of colors such as magenta, cyan, yellow, and black, on the output copy sheet. Registration requirements for new color reprographic machines are now far more stringent than the prior art registration requirements which were generally within a 125 um range.

Three techniques have been previously used for measuring photoreceptor position. The first employed a series of three holes punched in the edge of the P/R placed in a "Z" pattern, the second involved placing xerographically developed marks on the belt, and the third involves measurement of the position of the edge of the belt. The latter has been deemed preferable, as it enables continuous monitoring of the belt position even when the belt is stopped, and eliminates the need for additional holes in the photoreceptor.

Belt edge sensing is presently implemented using an open slotted, interruptive sensor, and appears to operate satisfactorily when the sensor is clean. However, experience has shown performance deteriorates during printing, as the optical surfaces of these sensors become coated with toner, and sensor cleaning intervals of 500–4000 copies are common. In addition, output of the devices is strongly affected by the optical transmissivity of the belt, and by the presence of holes in the belt edge required for seam sensing and belt registration. Both of these factors generate spurious signals, which may be interpreted by the control system as misregistration, when in fact the belt is well registered. Also, current edge sensors are relatively expensive.

In addition to the above mentioned prior art, U.S. Pat. No. 5,291,245 discloses an electro-optic sensor for recognizing a photoreceptor belt seam and U.S. Pat. No. 4,864,124 discloses an electro-optic sensor having a mechanical arm disposed for engagement with a moving copy sheet to rotate a sleeve within the light path of the sensor. Suitable rotation of the sleeve interrupts the light path to manifest the presence of a copy sheet.

It would be desirable, therefore, to be able to provide a relatively inexpensive sensor to measure photoreceptor lateral position as well as a sensor that minimizes the need for holes in the belt. In addition, it would be desirable to provide a lateral position measurement sensor that is very precise and does not exhibit deteriorating performance during machine operation.

It is an object of the present invention, therefore, to provide a low cost sensor to measure a belt edge location within 5 micrometers. It is another object of the present invention to be able to measure belt edge position independent of the optical transmissivity of the belt material and of the presence of holes in the belt. It is still another object of the present invention to minimize the effects of optical contamination on the performance of the sensor.

Other advantages of the present invention will become apparent as the following description proceeds, and the features characterizing the invention will be pointed out with particularity in the claims annexed to and forming a part of this specification.

SUMMARY OF THE INVENTION

There is provided a sensor having a shutter mounted upon a shaft for rotation within a housing in opposition to a light path between an LED and phototransistor. A portion of the shaft extends outside the housing connected to an elongated arm. A runner secured to the elongated arm engages a moving photosensitive surface and deviations of the edge position of the photosensitive surface rotate the shutter in relation to the light path between the LED and phototransistor. This enables the tracking of the edge position of the moving photosensitive surface by providing signals representing shutter position.

For a better understanding of the present invention, reference may be had to the accompanying drawings wherein the same reference numerals have been applied to like parts and wherein:

DETAILED DESCRIPTION OF THE DRAWINGS

Figure 4A:
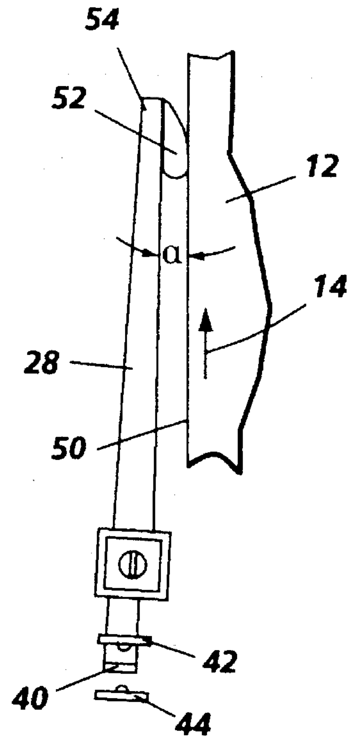
Figure 4B:
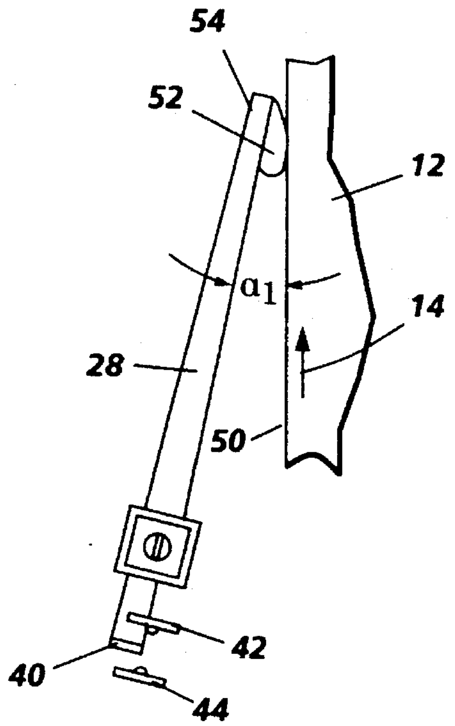
Figure 4C:
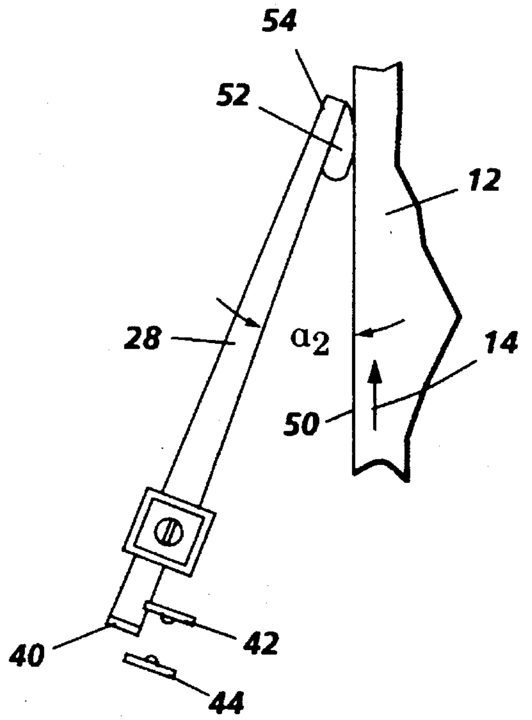
Figure 5:
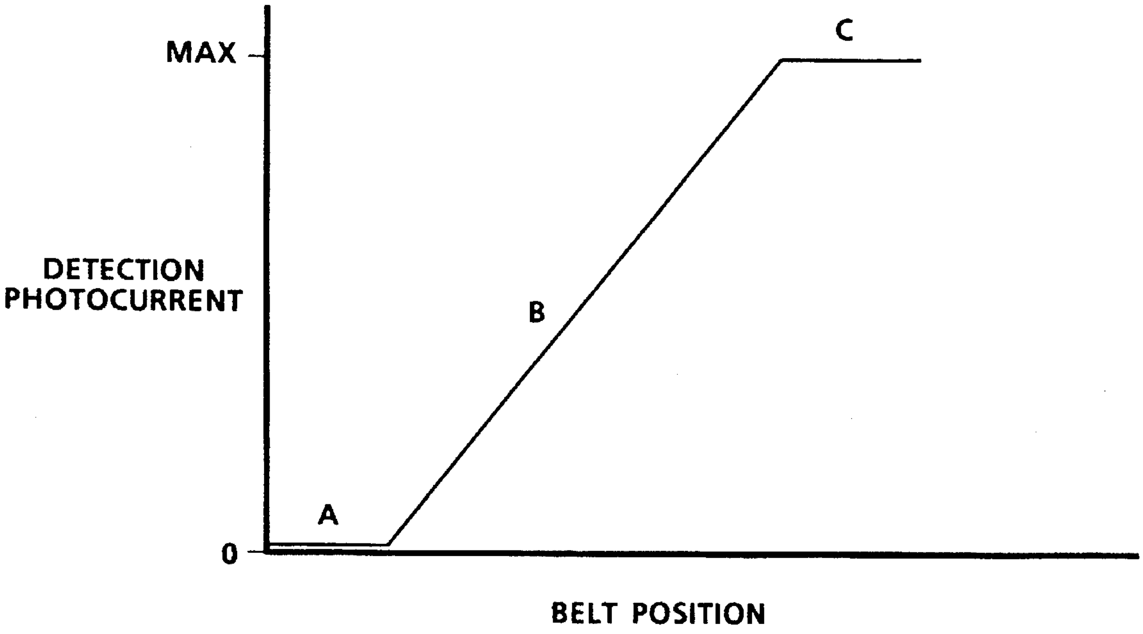
Figure 6:
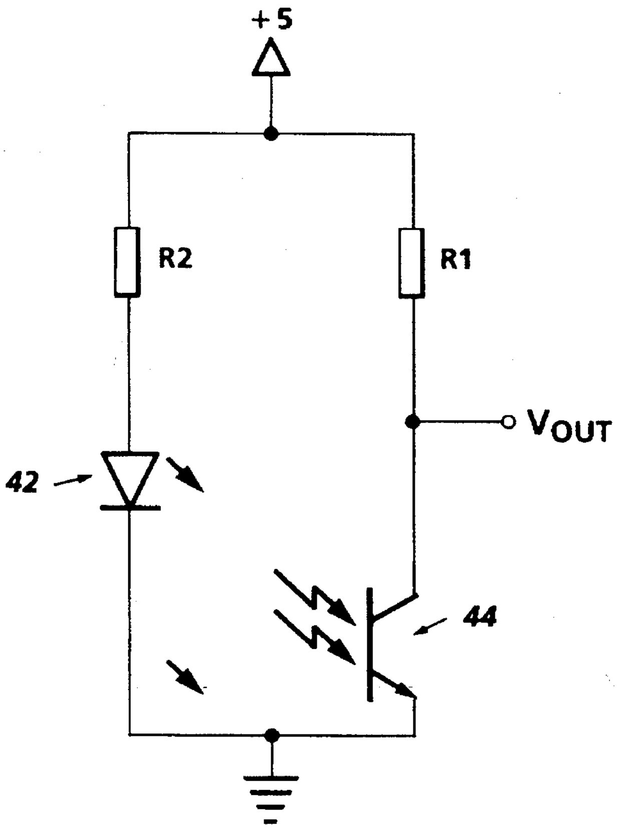

FIGS. 4A, 4B, and 4C illustrate operation of the sensor in accordance with the present invention;

FIG. 5 illustrates the relationship of photoreceptor belt position to sensor photocurrent and FIG. 6 illustrates a typical photodetector and circuit diagram for use with the present invention.

DETAILED DESCRIPTION OF THE PREFERRED EMBODIMENT

Figure 1:
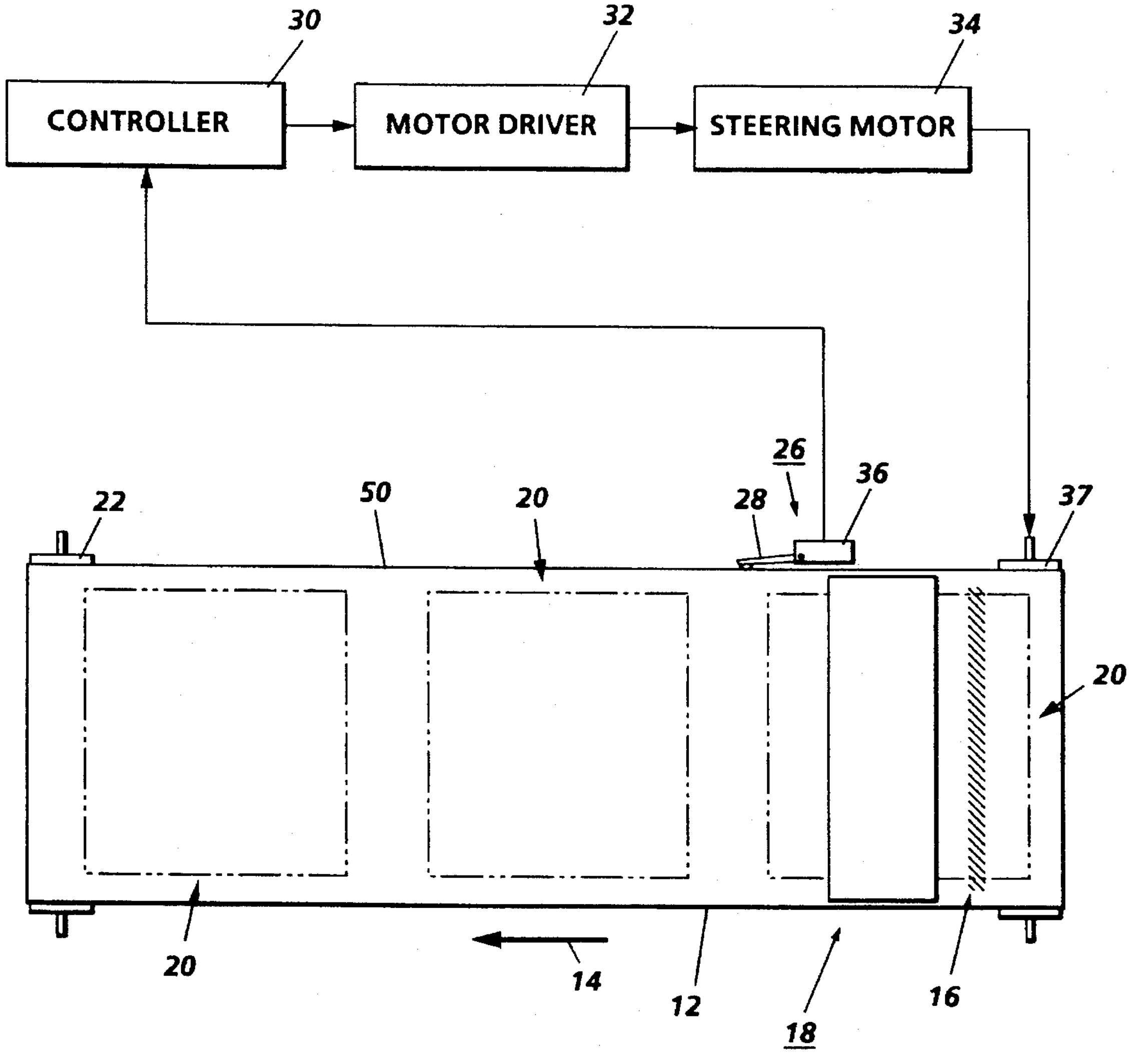
FIG. 1 is a block diagram depicting the the system incorporating the present invention.

With reference to FIG. 1, there is generally disclosed a photosensitive surface 12 suitably driven by drive roll 22 in the direction of arrow 14 in relation to an imaging zone 16 where latent images are projected upon the photosensitive surface 12 by well known imaging techniques and a developer housing 18 at which suitable toner is applied to develop the latent image for transfer to a not shown copy sheet. Various document image areas are shown by the dotted rectangular areas and illustrated at 20 along the photosensitive surface 12. The well know xerographic process for projecting images, developing the images, transferring to copy sheets, fusing the images to the copy sheets, and transporting to a suitable output station forms no part of the present invention.

In accordance with the present invention, a belt edge steering sensor 26 with a suitable actuating arm 28 is positioned adjacent the photosensitive surface 12 for the actuating arm 28 to engage an edge of the photosensitive surface 12. Suitable signals generated by the movement of the actuating arm 28 are provided by the steering sensor 26 to a microcontroller 30. In turn, the microcontroller 30 converts the arm position signals from the sensor 26 into driver signals to operate motor driver 32. The motor driver 32 provides motor signals to the steering motor 34 which in turn operates the steering roll 37 to provide suitable steering adjustments to adjust the edge position of the photosensitive surface 12.

Figure 2:
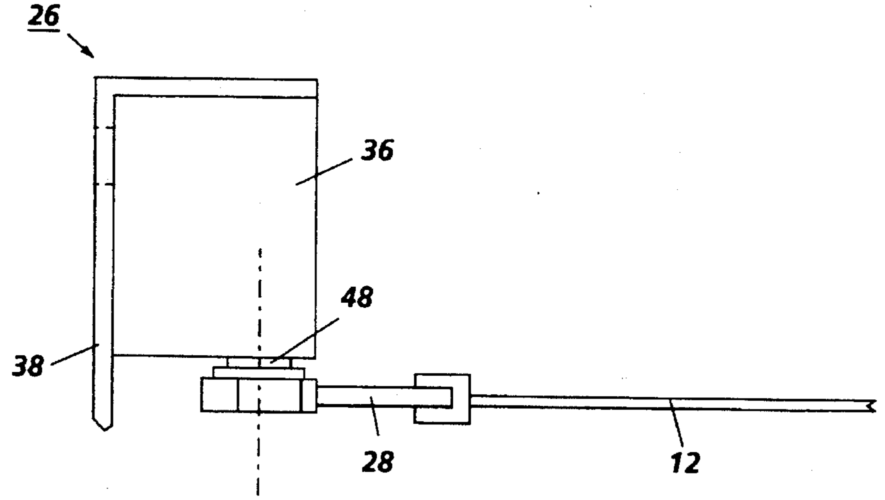
FIG. 2 is a side view of the sensor in accordance with the present invention.
Figure 3:
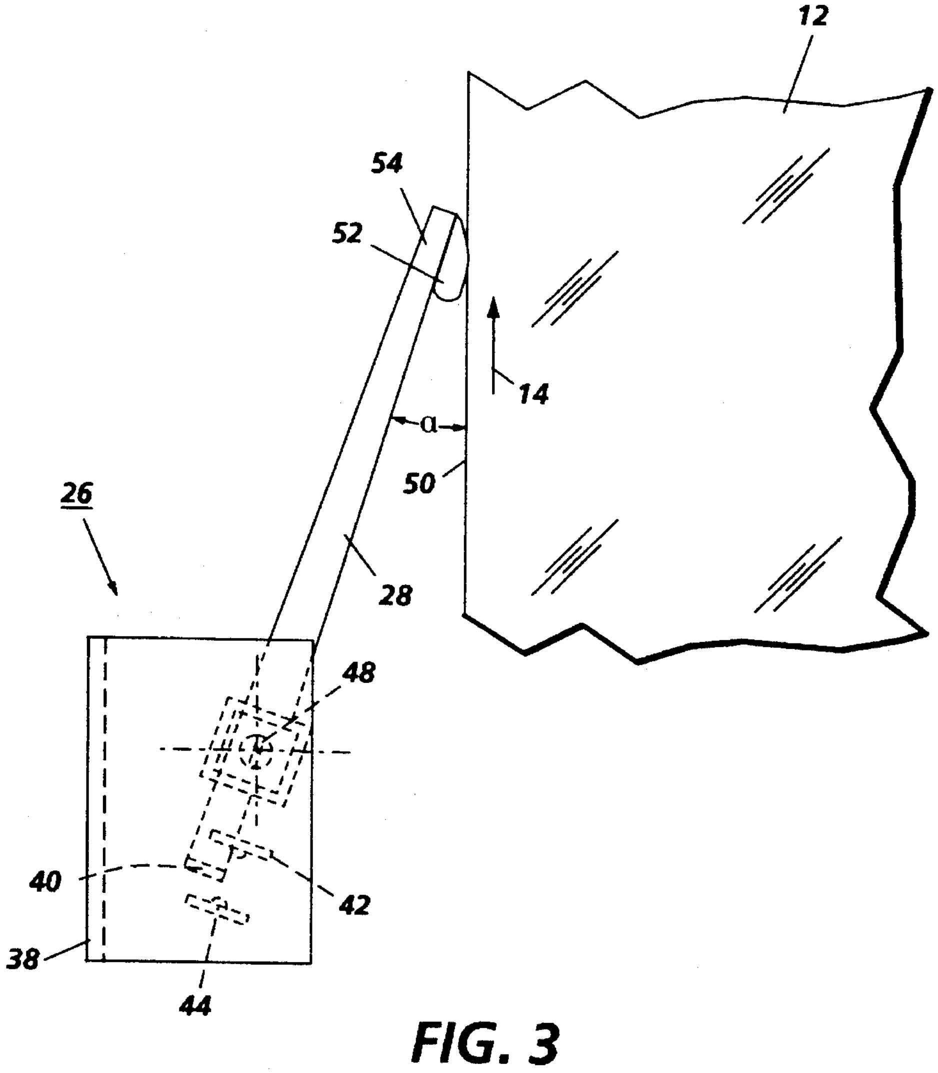
FIG. 3 is a top view of the sensor in accordance with the present invention.

With reference to FIGS. 2 and 3, there is illustrated one embodiment of the sensor 26 employing a flag switch architecture in accordance with the present invention. In particular, the sensor 26 is primarily affected by the position of the actuator arm 28 in contact with the photosensitive 12. Preferable, the actuator arm 28 is lightly spring loaded and at one end, runner 52, bears against the edge of the photos surface 12. The other end of the arm is in the shape of the shutter 40 (or flag) which is disposed to gradually interrupt a beam of light from striking a detector as the photosensitive surface or belt edge moves progressively outward and rotates the arm and shutter.

The sensor 26 includes a housing 36 suitably mounted by a bracket 38 to a frame in close proximity to the photosensitive surface 12. An LED 42 projects a beam of light in the direction of photodetector 44 with shutter 40 mounted at one end of the arm 28 for interrupting or blocking the light from striking photo detector 44 depending upon the relative position or rotation of the arm 28 with respect to the photosensitive surface edge 50. The actuating arm 28 is secured to shaft 48 outside of the housing 36 and the shutter 40 is secured to a portion of the shaft 48 extending inside the housing 36.

As the actuating arm moves or rotates about the point of the shaft 48 in relation to the position of the edge 50 of the photosensitive surface, the actuating arm 28 traces an arc about the shaft 48. This movement of the actuating arm 28 in turn rotates the shutter 40 to a position of more or less blocking of the light from the LED 42 striking the photo detector 44. A suitable skid or the runner 52 attached to the end 54 of the actuating arm 28 provides a suitable contact surface that tracks the edge 50 of the photosensitive surface with a minimum amount of edge wear or deterioration.

FIGS. 4A, 4B, and 4C illustrate the belt edge steering sensor 26 in operation. In particular, FIG. 4A illustrates the shutter 40 completely blocking the light path between the LED 42 and the photodetector 44 with the arm 28 at a very narrow angle "alpha" with respect to the edge 50 of the photosensitive surface 12 moving in the direction of arrow 14. This represents the edge 50 of the photoreceptor 12 at a given outward position or edge position in close proximity to the sensor 26. The complete blocking of the flux or light path of the LED 42 to the photodetector 44 results in a relatively low photodetector current.

FIG. 4C illustrates the position of the edge 50 of the photosensitive 12 at a relatively large angle alpha 2 with respect to the arm 28. In this position the shutter 40 is completely outside of the light path between the LED 42 and photodetector 44 and the edge 50 of the photosensitive surface is at an extreme inward position or relatively greater distance from the sensor 26. In this position the light emitted from LED 42 is completely received by the photodetector 44 and there is produced thereby a relatively large photodetector current.

FIG. 4B illustrates a nominal operating position wherein the arm 28 is at a position, angle alpha 1, midway between the position shown in FIGS. 4A and 4C. This is a reference position or normal operating position with the shutter 40 part way between the light path from the LED 42 to the photodetector 44. From this position, it can be seen that movement of the edge 50 of the photosensitive surface 12 toward the sensor 26 will pivot the shutter 44 into a further blocking alignment between the LED 42 and shutter 44 and a movement of the edge 50 of the photosensitive surface away from the sensor 26 will result in less blockage of the light path as the shutter 40 moves or pivots away from the edge 50.

The relationship of the photoreceptor surface edge 50 or photoreceptor position in relation to the photodetector 44 current is shown in FIG. 5. The relatively low current is shown at A in relation to FIG. 4A with the edge 50 in an extreme outer position or near position to the sensor 26. High current as illustrated at C is equivalent to the large angle $a_2$ as illustrated in FIG. 4C or an extreme innermost position of the edge 50 away from the sensor 26. The nominal operating position is generally illustrated at B as being generally a mid point or level of current between the two extreme positions. It should be understood, that there is a relationship of the photodetector 44 current to the position of the edge 50 in relation to the sensor 26. This photodetector current as illustrated in FIG. 1 is received by controller 30 to drive the steering roll 36 via the motor driver 32 and steering motor 34.

In FIG. 5, the photoreceptor belt edge position in relation to the detector current illustrates the changing photodetector current in response to the changing position or rotation of the arm 28 of the sensor 26. In operation, the shutter 40 gradually interrupts the beam of light from striking the detector 44 as the photosensitive surface 12 moves inward and outward rotating the arm and shutter. Preferable, the sensor includes a phototransistor to provide high level signals and eliminate the need for further manipulation and buffering of signals at the sensor head. Also, the shutter, LED and detector are preferably enclosed in a small molded plastic housing to prevent toner from being deposited on the optical surfaces and blocking the LED light from reaching the detector. Further, the housing provides mechanical support, alignment, and general mechanical protection. It should also be noted that in one embodiment, there was a five degree total rotation of the shutter from a nominal position to provide the minimum and maximum current readings.

FIG. 6 illustrates a typical sensor circuit. In particular, a plus 5 volts to ground parallel circuit includes the LED 42 and the photo transistor 44 and 1500 ohm resistor R1 and 200 ohm resistor R2. The output of the photo transistor is the photo detector current drop across R1. The minimal drop across resistor R1 is the result of the maximum light interruption by the shutter 40. On the other hand, with the high current flowing from the photodetector 44 shown in FIG. 4C, there is a maximum voltage drop across resistor R1 or maximum current flow.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

We claim:

1. A system for correcting the edge position of a moving photosensitive surface including a steering roll mechanically coupled to the photosensitive surface and a steering motor connected to the steering roll whereby the edge position of the photosensitive surface is changed comprising:

a sensor and a controller electrically connected to the sensor, the sensor including a housing, a substrate disposed within the housing, the substrate supporting an electro-optic sensor including an LED and a photodetector, a shutter mounted upon a shaft for rotation within the housing in a light path between the LED and photodetector, a portion of the shaft extending outside the housing, an elongated arm disposed outside the housing and having one end mechanically connected to said portion of the shaft, the other end of the elongated arm being spring loaded into contact with the photosensitive surface, a smooth, rounded element secured to the other end of the elongated arm, the rounded element engaging the moving photosensitive surface whereby deviations of the edge position of the photosensitive surface rotate the shutter in relation to the light path between the LED and photodetector and signals provided by the photodetector in response to the location of shutter in relation to the light path between the LED and photodetector determine the corrective action of the steering roll.

2. The sensor of claim 1 wherein the photo detector signals are a function of the relative deviation of the edge position of the photosensitive surface from a standard position.

3. A sensor for tracking the edge position of a moving photosensitive surface comprising:

a housing, a substrate disposed within the housing, the substrate supporting an electro-optic sensor including an LED and a photodetector, a shutter mounted upon a shaft for rotation within the housing in a light path between the LED and photodetector, a portion of the shaft extending outside the housing, an elongated arm disposed outside the housing and having one end mechanically connected to said portion of the shaft, runner secured to the other end of the elongated arm, the runner engaging the moving photosensitive surface whereby deviations of the edge position of the photosensitive surface rotate the shutter in relation to the light path between the LED and photodetector and a steering roll mechanically coupled to the photosensitive surface and a steering motor connected to the steering roll whereby the edge position of the photosensitive surface is changed in response to the location of shutter in relation to the light path between the LED and photodetector.

4. The sensor of claim 3 including a motor driver connected to the steering motor and a controller electrically interconnected between the photodetector and the motor driver whereby signals provided by the photodetector in response to the location of shutter in relation to the light path between the LED and photodetector determine the corrective action of the steering roll.

5. The sensor of claim 3 wherein the elongated arm is spring loaded into contact with the photosensitive surface.

6. The sensor of claim 3 wherein the runner is a smooth, rounded element.

7. The sensor of claim 3 wherein the photo detector signals are a function of the relative deviation of the edge position of the photosensitive surface from a standard position.

8. A sensor for tracking the edge position of a moving photosensitive surface comprising:

an electro-optic sensor including a light source and a photodetector, a molded housing enclosing the electro-optic sensor, a shutter mounted upon a shaft extending into the housing for rotation in a light path between the light source and photodetector, an elongated arm having one end mechanically connected to said shaft, and a contact member secured to the other end of the elongated arm disposed outside said molded housing, and engaging the moving photosensitive surface whereby deviations of the edge position of the photosensitive surface rotate the shutter in relation to the light path between the light source and photodetector.

9. The sensor of claim 8 including a steering roll mechanically coupled to the photosensitive surface and a steering motor connected to the steering roll whereby the edge position of the photosensitive surface is changed in response to the location of shutter in relation to the light path between the light source and photodetector.

10. The sensor of claim 9 including a motor driver connected to the steering motor and a controller electrically interconnected between the photodetector and the motor driver whereby signals provided by the photodetector in response to the location of shutter in relation to the light path between the light source and photodetector determine the corrective action of the steering roll.

11. A sensor for tracking the edge position of a moving photosensitive surface comprising:

an electro-optic sensor including an LED and a photodetector enclosed is a molded plastic housing, the housing blocking contamination on the electro-optic sensor, a shutter mounted upon a shaft for rotation in a light path between the LED and photodetector, an elongated arm having one end mechanically connected to said shaft, a contact member secured to the other end of the elongated arm engaging the moving photosensitive surface whereby deviations of the edge position of the photosensitive surface rotate the shutter in relation to the light path between the LED and photodetector, and a steering roll mechanically coupled to the photosensitive surface and a steering motor connected to the steering roll whereby the edge position of the photosensitive surface is changed in response to the location of shutter in relation to the light path between the LED and photodetector.

12. The sensor of claim 11 wherein the elongated arm is spring loaded into contact with the photosensitive surface.

13. The sensor of claim 11 wherein the photo detector signals are a function of the relative deviation of the edge position of the photosensitive surface from a standard position.

* * * * *